INVENTOR
HERMAN KARL MARIA GROSSER

BY
Frank R. Jifani
AGENT

Jan. 10, 1961 H. K. M. GROSSER 2,968,029

PERMANENT MEMORY STORAGE COMPRISING MAGNETICALLY BISTABLE CORES ARRANGED IN ROWS OF M-CORES EACH

Filed June 9, 1958 3 Sheets-Sheet 2

INVENTOR
HERMAN KARL MARIA GROSSER

BY
AGENT

INVENTOR
HERMAN KARL MARIA GROSSER
BY
AGENT

United States Patent Office 2,968,029
Patented Jan. 10, 1961

2,968,029

PERMANENT MEMORY STORAGE COMPRISING MAGNETICALLY BISTABLE CORES ARRANGED IN ROWS OF M-CORES EACH

Hermann Karl Maria Grosser, Hilversum, Netherlands, assignor to North American Philips Company, Inc., New York, N.Y., a corporation of Delaware Filed June 9, 1958, Ser. No. 740,794
Claims priority, application Netherlands June 28, 1957
4 Claims. (Cl. 340—174)

In many applications there is a need for a permanent memory capable of storing a large number (for instance 10,000 or more) of code groups of a definite number of code elements each and to produce, at will, any of these code groups. The term "permanent memory" is to be understood to mean herein a storage device the contents of which can be varied only by an external agency. If this action can be carried out readily, reference may be made to a "semi-permanent memory." Consequently, when producing an arbitrary code group, not even a temporary loss of stored information occurs and; this is termed "non-destructive reading." The memory has furthermore to fulfill the requirement that any of the code groups stored should be producible within a very short time (of the order of a few μsec.).

Memories of this kind may be used inter alia for the control of automatic telecommunication exchanges, for the fixed programming of electronic computers, for the control of railway signalling systems, for the control of translating machines and the like.

The permanent memory to which the invention relates comprises magnetically bistable cores arranged in rows of m-cores each; the memory serves to store a large number of code groups each consisting of $m$ bivalent code elements and to produce, at will, in parallel, any of these code groups in the form of the presence or absence of pulses in $m$ reading wires $Sp$ ($p=1, 2 \ldots m$). Each code group is stored in the memory by means of a wire which is threaded, in accordance with this code group, through one of the rows of cores, whilst each reading wire $Sp$ is threaded through all $p^{th}$ cores of all rows. In accordance with the invention each row corresponds to $a$ code groups, and groups of $b$ rows are united to form a core matrix, the memory comprising $c$ core matrices, so that the position of a code group in the memory is determined by an address of three co-ordinates $x, y, z$, of which $x$ designates the position of the code group concerned in the row concerned, $y$ the position of the row concerned in the core matrix concerned and $z$ the core matrix concerned; the memory comprises $a$ wires $A_1 \ldots A_a$, which are threaded through all rows of all core matrices in a manner such that the wire $A_x$ is threaded in accordance with the code group $(x, y, z)$ through the $y^{th}$ row of the $z^{th}$ core matrix; the memory further comprises $b$ wires $B_1, \ldots B_b$ of which the wire $B_y$ is threaded through all cores of the $y^{th}$ rows of each core matrix and finally $c$ wires $C_1 \ldots C_c$, of which the wire $C_z$ is threaded through all cores of all rows of the $z^{th}$ core matrix.

The cores used in the memory are preferably ring-shaped; in this case a winding around a core may consist of a single wire threaded through this core. The terms "row" and core matrix refer only to the electrical arrangement of the cores and not to the spatial distribution thereof. As a matter of course, the spatial distribution of the cores will be preferably adapted to a greater or smaller extent to their electrical arrangement, but this is sometimes not efficient for purely mechanical reasons.

One embodiment of the invention will be described more fully with reference to the drawing.

Figure 1:
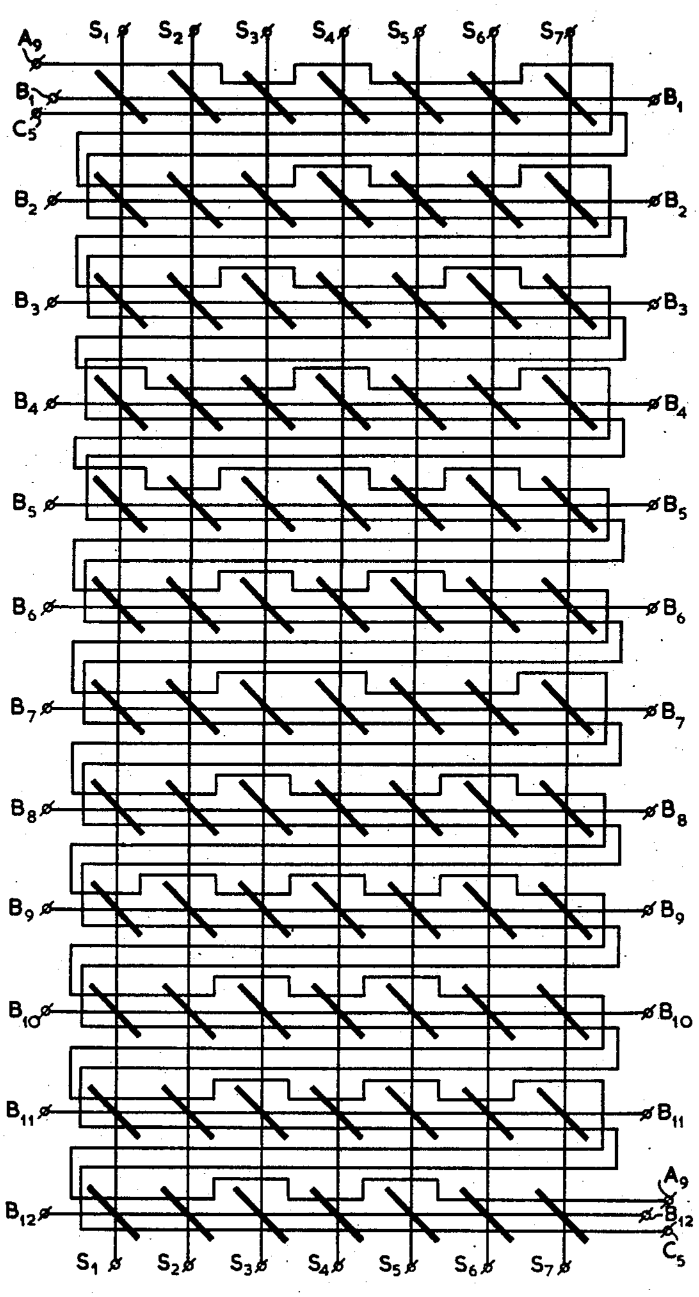
Fig. 1 shows a core matrix with 12 rows of 7 cores each and the A, B and C-wires taken through them.

Fig. 1 shows the fifth core matrix of a memory according to the invention, in which 192 code groups of 7 code elements each can be stored. The field comprises 12 (shown horizontally) rows of 7 annular cores each of a material having an at least approximately rectangular magnetization curve and two stable magnetic states, which are distinguished by the numerals 0 and 1. Each annular core is indicated in the figure by a heavy line at 45°. Through the rows are threaded 16 A-wires, of which the figure shows only the $A_9$-wire. Each row thus corresponds to 16 code groups. The wire $A_x$ is threaded, in accordance with the code group $(x, y, z)$ through certain cores of the $y^{th}$ row of the $z^{th}$ core matrix. If the code group with the address (9, 6, 5) is, for example (1101011), the wire $A_9$ passes through the first, second, fourth, sixth and seventh core of the sixth row of the fifth core matrix, but not through the third and the fifth cores of this row. Furthermore, all cores of each row are traversed by a B-wire (through the cores of the first row the wire $B_1$, through the cores of the second row the wire $B_2$ and so on). Finally all cores of all rows of each core matrix are traversed by a C-wire (through the cores of the first core matrix the wire $C_1$, through the cores of the second core matrix the wire $C_2$ and so on). The C-wires are threaded through all cores of the matrices in a manner such that a sufficiently strong current pulse through a C-wire changes over all cores of the matrix concerned from the state 0 into the state 1, irrespective of the initial state of the cores of the said matrix.

Finally through all first cores of all rows is threaded a reading wire S1, through all second cores of all rows is threaded a reading wire S2 and so on.

A current pulse passing through an A-, B-, C- or S-wire is called positive, when the cores through which this wire passes are driven from the state 0 into the state 1, if the said current pulse is sufficiently strong. Furthermore, the pulse induced into an S-wire by a core through which it is threaded is called positive, when this pulse is produced by the change-over of the core from the state 1 into the state 0.

The pulses induced into the S-wires are usually of too low a magnitude to be employed directly; for this reason these wires are connected to the input terminals of amplifiers (not shown in the drawing). The inputs of these amplifiers comprise preferably gates, which can be opened and closed by the control of the memory, so that all unwanted pulses in the S-wires can be arrested. As an alternative, the amplifiers may be such that they amplify the positive pulses but do not transmit the negative pulses.

The matrix shown in Fig. 1 may serve, in itself, as a permanent memory in which are stored 192 code groups. It is assumed that the code group (9, 8) is to be produced, i.e. the code group corresponding to the manner in which the wire $A_9$ is threaded through the eighth row (since the memory has only one matrix, the co-ordinate $z$ is superfluous). All cores are initially set to the state 0. This may be carried out by passing a sufficiently strong negative current pulse through the C-wire. The negative pulses then produced in the seven S-wires are stopped by the gates in the amplifiers connected to the S-wires, which gates are then closed. Then a strong positive current pulse is passed through the wire $A_9$, so that the 12 code groups (9, 1), (9, 2) . . . (9, 12) are written in the 12 rows. Thus particularly, the first, second, fourth, fifth and seventh core of the eighth row are changed over to the state 1 and the third and the sixth core of this row remain in the state 0. The positive pulses thus occurring in the seven S-wires are also stopped by the closed gates in the amplifiers. Then such a strong negative current pulse is passed through the wire $B_8$ that the first, second, fourth, fifth and seventh core of the eighth row are driven back into the state 0, whereas the same time the gates of the amplifiers are opened. Thus negative pulses occur in the wires $S_1$, $S_2$, $S_4$, $S_5$, $S_7$ and these pulses are amplified in the amplifiers. This group of parallel pulses constitutes the code group associated with the address (9, 8); for this reason these pulses are termed reading pulses.

Figure 2:
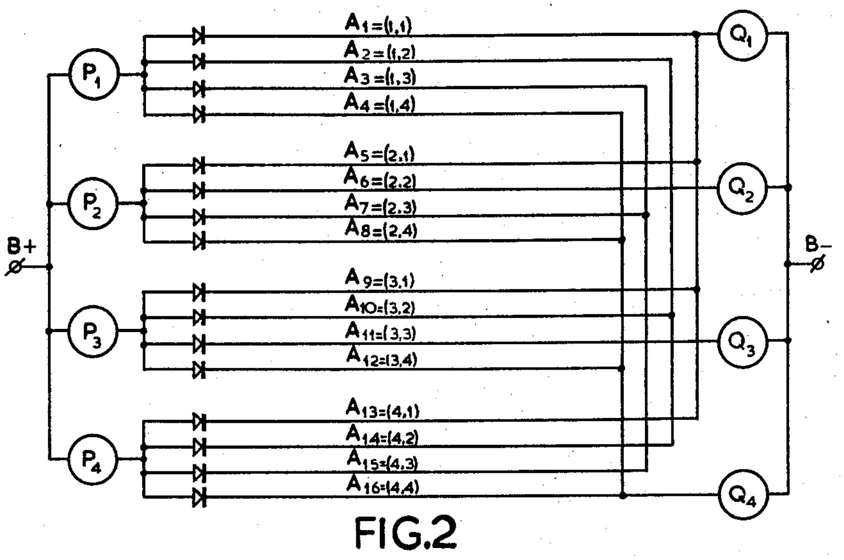
Fig. 2 shows one example of the control of the A-wires.

Fig. 2 shows an example of a control circuit for passing the current pulses through the A-wires. The 16 A-wires are designated by the numeral combinations $A_1=(1,1)$, $A_2=(1,2)$, $A_3=(1,3)$ . . . $A_{16}=(4,4)$. The four A-wires $(i,1)$, $(i,2)$, $(i,3)$, $(i,4)$ are connected on the left-hand side to the output terminal of a gate $P_i$ ($i=1, 2, 3, 4$) and the four A-wires $(1,j)$, $(2,j)$, $(3,j)$, $(4,j)$ are connected on the right-hand side to the input terminal of a gate $Q_j$ ($j=1, 2, 3, 4$). The four input terminals of the four gates $P_i$ are connected to the positive terminal $B_+$ of a direct-current source and the four output terminals of the four gates $Q_j$ are connected to the negative terminal of this current source. All A-wires include a rectifier, having a pass direction from $B_+$ to $B_-$. It can be readily seen that, when the gates $P_i$ and $Q_j$ are open and all further gates are closed, only the wire $(i,j)$ passes current. The rectifiers included in the A-wires block all further current paths from $P_i$ to $Q_j$.

Figure 3:
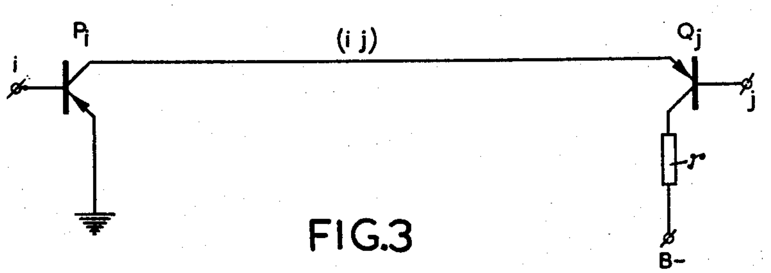
Fig. 3 shows one example of a transistorized circuit arrangement for the control illustrated in Fig. 2.

The gates $P_i$ and $Q_j$ may be of any known type. Fig. 3 shows a transitorized embodiment of the gates $P_i$ and $Q_j$. The wire $(i,j)$ is connected to the collector of the p-n-p transistor $P_i$ and to the emitter of the p-n-p transistor $Q_j$. The emitter of the transistor $P_i$ is connected to earth and the collector of the transistor $Q_j$ may be connected via the resistor $r$ to the negative terminal of a current source, the positive terminal of which is earthed. The bases of the transistors $P_i$ and $Q_j$ are connected to control-terminals $i$ and $j$ respectively. Normally the bases have such voltages that the transistors do not pass current. By applying negative pulses to the control-terminals $i$ and $j$ the transistors $P_i$ and $Q_j$ become conductive and the wire $(i, j)$ thus pasess a current pulse.

The control of the B-wires may be effected with transistors in a similar manner.

Figure 4:
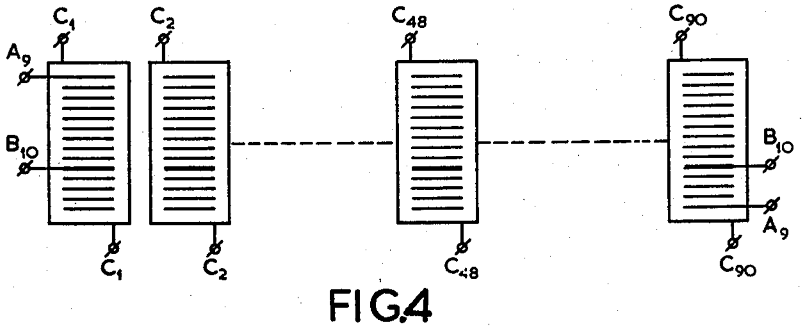
Fig. 4 shows a diagram of the complete memory.

Fig. 4 shows the diagram of a memory comprising 90 core matrices of the kind shown in Fig. 1; this memory can store 90.192=17,280 code groups. The A-, B- and S-wires of this memory with the same subscript are connected in series, so that the memory comprises in total 16 A-wires, 12 B-wires, 90 C-wires and 7 S-wires. The wire $A_x$ is threaded through all rows of all matrices; it is threaded through the $y^{th}$ row of the $z^{th}$ field, in accordance with the code group $(x, y, z)$. The wire $B_y$ is threaded through every core of the $y^{th}$ row of every matrix. The wire $C_z$ is threaded through every core of every row of the $z^{th}$ matrix. The wire $S_p$ is threaded through the $p^{th}$ core of every row of every matrix. It will be assumed that the code group (9, 10, 48) is to be produced. Initially all cores of all rows of all matrices are set in the state 0; those that were already in this state, of course, remain so. This may be performed inter alia by passing negative current pulses through the 12 B-wires, negative current pulses through the 90 C-wires, negative current pulses through the 7 S-wires or a negative current pulse through a reset wire (not shown), this reset wire passing through every core of every row of each matrix. The negative pulses induced in the S-wires by this operation are stopped by the gates in the amplifiers connected to the S-wires. Then positive current pulses of an amplitude $1/2i$ are passed through the wires $A_9$ and $B_{10}$, wherein $i$ is a value such that a current pulse of sufficient duration and of an amplitude $i$ in a wire passing through a core changes over with certainty this core from the state 0 into the state 1, whereas a current pulse of an amplitude $1/2i$ is certain not to perform this change-over. Thus the ninth code group is written in each tenth row of each matrix. Consequently, in total 90 code groups are written in the memory. The positive pulses induced by this operation in the S-wires are stopped by the closed gates in the inputs of the amplifiers connected with the S-wires. Finally, a negative current pulse of an amplitude $i$ is passed through the wire $C_{48}$, whilst at the same time the gates in the inputs of the amplifiers connected to the S-wires are opened. Thus al cores of the tenth row of the 48th field which were not already in state 0 are driven into the state 0 and the code elements of the code group associated with the address (9, 10, 48) appear in the 7 S-wires in the form of the presence or absence of negative pulses. These pulses are amplified in the amplifiers connected to the S-wires.

The control of the 16 A-wires requires 8 transistors (16=4×4) and 16 diodes; the control of the 12 B-wires requires 7 transistors (12=3.4) and 12 diodes; the control of the 90 C-wires requires 19 transistors (90=9.10) and 90 diodes. In total the memory comprises, consequently 34 transistors and 118 diodes.

If the memory had not been subdivided into matrices, it would have needed 1080 rows and hence as many B-wires. The control thereof would have required 66 transistors (1080=30.36; 30+36=66) and 1080 diodes. It thus appears that the subdivision of the memory into matrices provides an important economy in transistors and diodes for the control circuit.

Moreover, the matrices cannot have an unlimited number of rows, since the production of a code group by a current pulse in a C-wire involves interference pulses (so-called parasitic pulses) in the S-wires, which pulses emanate from the cores of all rows of the field not associated with the code group concerned. The permissible number of rows per field depends on the greater or smaller extent of approximation to rectangularity of the cores; usually this number will not exceed 12.

It is furthermore necessary to provide sufficiently steep leading edges for the current pulses in the C-wires in order to obtain strong reading pulses in the S-wires.

Figure 5:
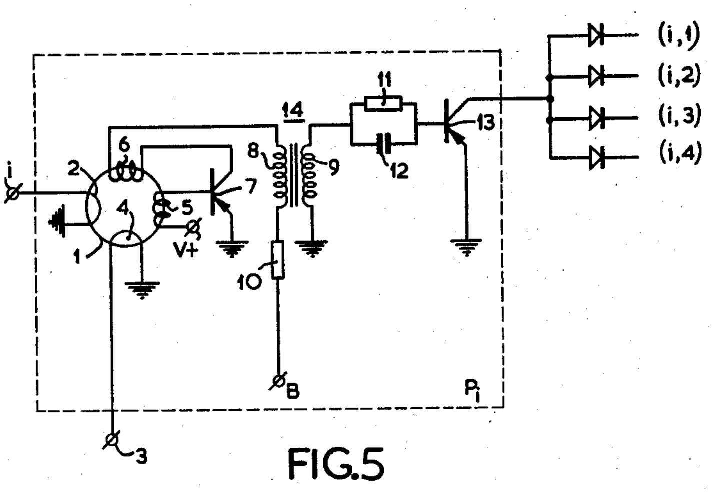
Fig. 5 shows one example of a gate circuit.

Fig. 5 shows an improved arrangement of a gate $P_i$ (Fig. 2). The gates $Q_j$ may be constructed in a similar manner.

The gate $P_i$ shown in Fig. 5 comprises a ferrite ring 1, a transistor 7, a transformer 14 and a p-n-p transistor 13. The ferrite ring 1 is provided with a first input winding 2, of which one end is connected to a first input terminal $i$ and of which the other end is connected to earth, and a second input winding 4, of which one end is connected to an input terminal 3 and of which the other end is connected to earth. The ferrite ring has, moreover, an output winding 5, which is connected on the one hand to a positive voltage source $V_+$ and on the other hand to the base of the transistor 7. Finally the ferrite ring has a feed-back winding 6, which is connected on the one hand to the collector of the transistor 7 and on the other hand to one end of the primary winding 8 of the transformer 14. The other end of this primary winding is connected to earth, if necessary via a resistor 10. One end of the secondary winding 9 of the transformer 14 is connected to earth and the other end is connected via the parallel combination of a resistor 11 and a capacitor 12 to the base of the transistor 13. The emitter of this transistor is connected to earth, and its collector is connected to the wires $(i, 1)$, $(i, 2)$, $(i, 3)$ and $(i, 4)$.

The first input windings and the control terminals $i$ and $j$ are individual, i.e. each gate $P_i$ or $Q_j$ has its own first input winding 2 and its own control terminal $i$ or $j$ respectively. The input terminal 3, however, is not individual for example since all second input windings 4 of all ferrite rings 1 of all gates $P_i$ and $Q_j$ are connected in series. However, as an alternative, they may be connected in parallel, if desired group-wise.

The senses of winding of the various windings, 2, 4, 5 and 6 of the ferrite ring 1 are not arbitrary. It is assumed that the senses of the current pulses to be applied to the terminals $i$ and 3 are positive (this may otherwise be done at will). Also the winding sense of the winding 2 may be chosen at will. The state into which the ferrite ring arrives by a sufficiently high current pulse across the winding 2 is indicated by 1. The sense of winding of the winding 4 must then be such that a sufficiently high, positive current pulse across it changes over the ferrite ring from the state 1 into the state 0. The output winding 5 must be such that the change-over of the ferrite ring 1 from the state 1 into the state 0 renders negative the base of the transistor 7. The winding sense of the feedback winding 6 must be such that the current pulse occurring therein when the transistor 7 is conductive, accelerates the change-over of the ferrite ring from the state 1 into the state 0.

The system operates as follows: It is assumed that a current pulse is to be passed through the wire $(i, j)$. Then positive current pulses are applied to the control terminals $i$ and $j$, so that the ferrite rings 1 of the gates $P_i$ and $Q_j$ are changed over to the state 1. Then a positive current pulse is passed to the input terminal 3, so that these ferrite rings are again changed over to the state 0. The voltage pulse thus induced into the output winding 5 renders the base of the transistor 7 sufficiently negative to produce a current pulse across its collector. This current pulse is passed through the feed-back winding 6, so that a pulse is produced which has a very steep leading edge. This pulse is applied via the transformer 14 and the parallel combination 11, 12 to the base of the transistor 13, which thus becomes conductive for a short time. At the same time also the transistor 13 of the gate $Q_j$ is rendered conductive for a short time, so that a pulse with steep edges is passed through the wire $(i, j)$.

What is claimed is:

1. A permanent memory comprising a plurality of magnetic cores having a substantially rectangular hysteresis curve, said cores being arranged in rows, each row containing $m$ cores and corresponding to $a$ code groups, $b$ rows being combined to form a core matrix, the memory comprising $c$ core matrices, a group of wires totalling $a$ and designated $A_1 \ldots A_a$ threaded through all rows of all core matrices, the wire $A_x$ being threaded through the $y^{th}$ row of the $z^{th}$ core matrix according to the code group $x$, $y$, $z$, a group of wires totaling $b$ and designated $B_1 \ldots B_b$, the wire $B_y$ being threaded through all cores of the $y^{th}$ row of every core matrix, a group of wires totaling $c$ and designated $C_1 \ldots C_c$, the wire $C_z$ being threaded through all cores of all rows of the $z^{th}$ core matrix, and a group of reading wires totaling $m$ and designated $S_1 \ldots S_m$, each reading wire $S_p$ being threaded through all $p^{th}$ cores of all rows, the position of a code group in the memory being determined by an address of three co-ordinates $x$, $y$, $z$ of which $x$ designates the position of the code group concerned in the row concerned, $y$ designates the position of the row concerned in the matrix concerned, and $z$ designates the core matrix concerned.

2. A permanent memory as claimed in claim 1 wherein one group of wires is divided into $p$ subgroups of $q$ wires each, each wire being designated by an order pair of numbers $(i, j)$, the wires $(i, 1)$, $(i, 2) \ldots (i, q)$ being connected at one end to the output terminal of a gate $P_i$, the wires $(1, j)$, $(2, j) \ldots (p, j)$ being connected at one end to a gate $Q_j$, whereby the wire $(i, j)$ is connected at one end to the gate $P_i$ and at the other end to the gate $Q_j$, and means for activating simultaneously a gate $P_i$ and a gate $Q_j$ thereby activating the wire $(i, j)$.

3. A memory as set forth in claim 2, wherein a rectifier is included in each wire $(i, j)$ in series with gates $P_i$ and $Q_j$.

4. A memory as claimed in claim 2, wherein each gate comprises a ferrite ring having coupled thereto first and second input windings, an output winding and a feedback winding, a first input terminal connected to said first input winding, a second input terminal connected to said second input winding, a first transistor having input and output electrodes, the output winding being connected to the input electrode, the feedback winding being connected to the output electrode and to an output circuit, a current pulse being produced in the output circuit in response to current pulses applied to said first and second terminals.

References Cited in the file of this patent

UNITED STATES PATENTS

| | | |
|---|---|---|
| 2,691,152 | Stuart-Williams | Oct. 5, 1954 |
| 2,733,861 | Rajchman | Feb. 7, 1956 |